Sept. 2, 1958 R. C. ORFORD ET AL 2,850,029
CONTROL ARRANGEMENTS FOR ROTATING MACHINERY
Filed March 2, 1953 3 Sheets-Sheet 1

FIG. I.

INVENTORS
Roy C. Orford
John Constantine Grey
BY Stevens, Davis, Miller & Mosher
their ATTORNEYS Sept. 2, 1958 R. C. ORFORD ET AL 2,850,029
CONTROL ARRANGEMENTS FOR ROTATING MACHINERY
Filed March 2, 1953 3 Sheets-Sheet 2

INVENTORS
Roy C. Orford
John Constantine Grey
BY Stevens, Davis, Miller & Mosher
ATTORNEYS United States Patent Office 2,850,029
Patented Sept. 2, 1958

2,850,029

CONTROL ARRANGEMENTS FOR ROTATING MACHINERY

Roy C. Orford, Sevenoaks, and John Constantine Grey, Isleworth, England, assignors to Power Jets (Research & Development) Limited, London, England, a British company Application March 2, 1953, Serial No. 339,886

Claims priority, application Great Britain March 14, 1952

4 Claims. (Cl. 137—28)

This invention relates to control arrangements for rotating machinery.

It is frequently desirable to provide not only visual indication of some operating conditions, e. g. the rotational speed, of machinery but to arrange for automatic controls to be brought into operation when predetermined conditions are attained. Moreover failure of some auxiliary equipment may have dangerous results if continued running is allowed. For example a pressure lubricating system must be operating before the high speed machinery it serves can be safely run up. Moreover, if the oil pump fails during operation of the machinery it is preferable that there should be an immediate automatic response and a controlling effect exercised as a result.

The present invention provides a control arrangement for rotating machinery comprising a member arranged to be mounted in a magnetically insulated manner about the rotational axis of a part of said machinery and to form part of a magnetic circuit, a pick-up unit co-operable with said member to complete said magnetic circuit and to give a response in an associated electrical circuit which is proportioned to the rotational speed of said part and a device in said electrical circuit operable to effect a control over the operation of the machine upon a predetermined speed being attained.

The member itself may be a permanent magnet and the controlling device may be responsive either to frequency or voltage. The control effected may be the shutting down of the machinery.

In the case of a fluid-flow turbo-machine, such as a turbine, a control over the flow of fluid through the machine can be an effective control arrangement and it is not necessarily only applicable as a speed-responsive control.

Accordingly the invention provides a control arrangement for a fluid-flow turbo-machine comprising means for giving a response external to the machine of an operating condition thereof, a duct through which said fluid flows to the machine, a device in said duct operable to regulate the flow and means upon which said response is automatically effective in a predetermined operating condition to operate said device.

In responding to rotational speeds the need for mechanical connection from a rotating part, which can be undesirable, particularly with high rotational speeds, may be avoided by incorporating an induction coupling between rotary and stationary parts.

The invention further provides a control arrangement for a fluid-flow turbo-machine having a regulating valve in the inlet duct thereto and a non-magnetic shaft which arrangement comprises a member mounted upon said shaft and rotatable therewith, a pick-up unit positioned adjacent said member so as to complete a magnetic circuit through that member and operable to produce an electrical signal indicative of the rotational speed of said shaft, a signal responsive device operable to control said regulating valve and an electrical circuit extending from said pick-up unit to said controlling device.

The regulating valve may also be arranged to close automatically or to be pevented from being opened in the absence of a predetermined lubricating oil pressure.

The invention will be described by reference to one embodiment thereof which is given by way of example only and which is shown in the accompanying drawings. The latter show a control arrangement for a plant incorporating a radially inward flow turbine whose normal running speed is high, e. g. 30,000 R. P. M.

In the drawings:

Figure 3 is a sectioned elevation of the line III—III of Figure 4.

Figure 4 is a sectioned plan on the line IV—IV of Figure 3.

Figure 1:
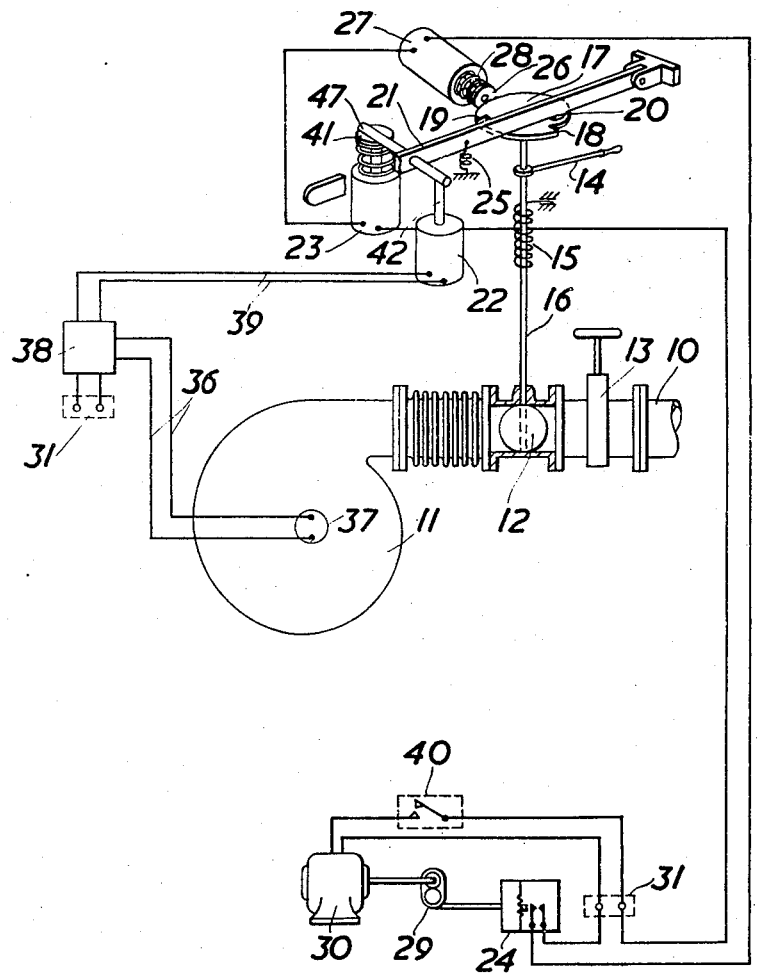
Figure 1 is a diagrammatic layout of the control arrangement in which the mechanism is shown in simplified form.

Referring first to Figure 1 there will be seen there in diagrammatic form the layout of the control arrangement for a high speed turbine. The turbine inlet is in the form of a duct 10 leading tangentially to the periphery of the turbine wheel about which it forms a scroll 11. Upstream of the turbine there is a butterfly valve 12 and beyond that again a manually-operated isolating valve 13. The butterfly valve is arranged to have only two positions, i. e. fully closed or fully open. A handle 14 is provided for setting the valve in the open position but it is normally biased by a spring 15 to the closed position. The valve is opened and closed by means of a spindle 16 which passes through a gland in the side of the duct and which carries at its outside end a circular plate 17 with two detents 18 and 19 in its edge. In the detent 18 a pawl 20 on a lever arm 21 engages to keep the valve in the open position. A small displacement of the lever arm releases the pawl from the detent and the spring 15 immediately causes the butterfly valve to shut. The disengagement of the pawl from the detent is accomplished by the operation of either one or the other of two solenoids 22 and 23 which co-operate with the lever arm. One solenoid is under control of the lubricating oil pump delivery pressure via the pressure operated switch 24 and the other under control of an overspeed device further described below.

When the valve 12 is closed the pawl 20 is disengaged from the detent 18. The valve is held in position by a spring 15 and in this position the detent 19 is arranged to be opposite a spring-urged plunger 26 controlled by the solenoid 27. The solenoid 27 is in series with the solenoid 23 and with the pressure operated switch 24. If the solenoid is energised then the plunger 26 is held out of engagement with the plate 17 but when the solenoid 27 is de-energised then the spring 28 causes the plunger 26 to engage with the detent 19 so locking the position of the plate 17. When the plate is so locked then the butterfly valve 12 is maintained closed; it cannot be opened manually by the handle 14.

The arrangement of the oil pump and its associated electrical circuit is such that the contacts of the pressure operated switch 24 cannot be closed until sufficient pressure is built up by the lubricating oil pump 29 which is itself driven by the electric motor 30. Electric supply terminals are shown at 31. When a sufficient oil pressure has been built up then the solenoids 23 and 27 are energised in series.

Figure 2:
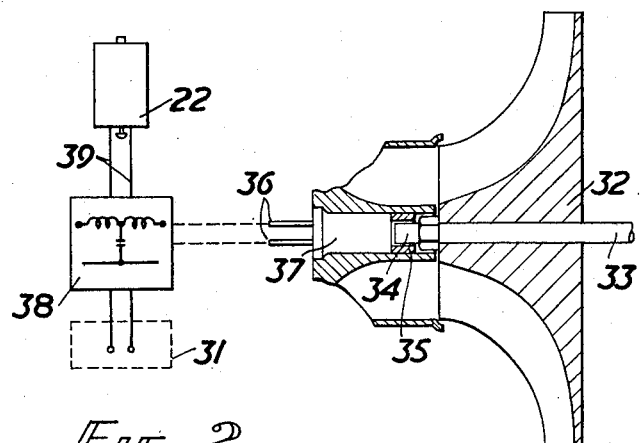
Figure 2 is complementary to Figure 1 and will be used to describe the electrical overspeed safety gear.

An overspeed arrangement for tripping the lever arm 21 and closing the butterfly valve 12 at a predetermined speed is shown diagrammatically in Figure 1 and in a little more detail in Figure 2. A rotating part of the plant is shown at 32 and it will be seen that this is mounted upon a shaft 33. This shaft is of austenitic steel and is therefore non-magnetic. A small but powerful permanent magnet is mounted as shown at 34 on the nut at the end of the shaft. The nut is likewise non-magnetic. The magnet 34 together with the pole system 35 forms an alternator the output from which is taken via leads 36 from the pick-up body 37 which has the pole system 35 at its end. It is clear that the frequency of the current developed in the circuit connected to the leads 36 is directly proportional to the rotation speed of the shaft 33. The current from the leads 36 is applied to the control circuit 38 which if necessary may incorporate an amplifier. In any case the control circuit does incorporate a filter circuit which produces an output to control the solenoid 22. Preferably the filter in the control circuit 38 is a low pass filter which cuts off current to a relay controlling the solenoid 22 when a predetermined frequency is reached. In that way failure of the pick-up unit 37 or breakage of the leads 36 will operate the solenoid 22 as if the predetermined frequency had been reached. It is also possible and may be desirable to arrange that the solenoid 22 trips the lever arm 21 whenever current ceases to flow through the solenoid 22. This would take care of any breakage of the leads 39 upsetting the operation of the overspeed device.

Consider the operation of the control arrangement from the moment of switching on the starting switch 40 for the electric motor 30 driving the oil pump. In the stationary condition the butterfly valve 12 is closed, the manually operated valve 13 is closed, the plate 17 is engaged by its detent 19 with the plunger 26 but the detent 18 is out of alignment with and clear from the pawl 20. The three solenoids are all unoperated. The first action is to switch on the motor for the oil pump and allow the oil pump pressure to build up. The next action is to open the manually operated valve 13. By this time the oil pressure will have built up sufficiently to close the contacts in the pressure operated switch 24 and solenoids 23 and 27 are therefore energised. The energisation of solenoid 27 removes the plunger 26 from the detent 19 so allowing the plate 17 to be turned by the handle 14. The solenoid 23 having been energised the plunger 41 of that solenoid is lowered and thus it permits the lever arm 21 to engage its pawl 20 with the detent 18, the two having been brought into alignment by rotation of the plate 17. The spring 25 holds the pawl and detent in engagement and the butterfly valve is therefore kept open. Fluid flows through the duct 10 and the scroll 11 to the turbine and the speed of the rotating plant builds up.

Let it now be supposed that the rotational speed passes a predetermined limit so that the control circuit 38 operates to cut off the current to the solenoid 22. The plunger 42 of that solenoid is arranged to rise when the current to the solenoid is cut off and it overcomes the resistance of the spring 25 so raising the arm 21 and disengaging the pawl 20 from the detent 18. The spring 15 immediately rotates the spindle 16 to close the butterfly valve 12. Operation of the control circuit 38 this way may also be arranged if desired to de-energise the solenoids 23 and 27 after a small time delay so that the plunger 26 is engaged again with the detent 19 in the plate 17 so preventing restarting. This arrangement is however not shown in Figure 1.

Let it now be assumed that the oil pressure fails for some reason during running of the turbine. This will cause the pressure operated switch contact 24 to open and the solenoids 23 and 27 will be de-energised. Spring action immediately raises the plunger 41 of the solenoid 23. This disengages the lever arm 21 from the plate 17 and causes the butterfly valve to close as before. As solenoid 27 is also de-energised its plunger engages with the detent in the plate 17 and the butterfly valve again may not be manually opened by the lever 14 until the oil pressure has been built up. The butterfly valve being closed no fluid flows to the turbine and the turbine slows down and stops, so preventing damage that would otherwise have been caused due to the lack of lubricating oil pressure.

Figure 4:
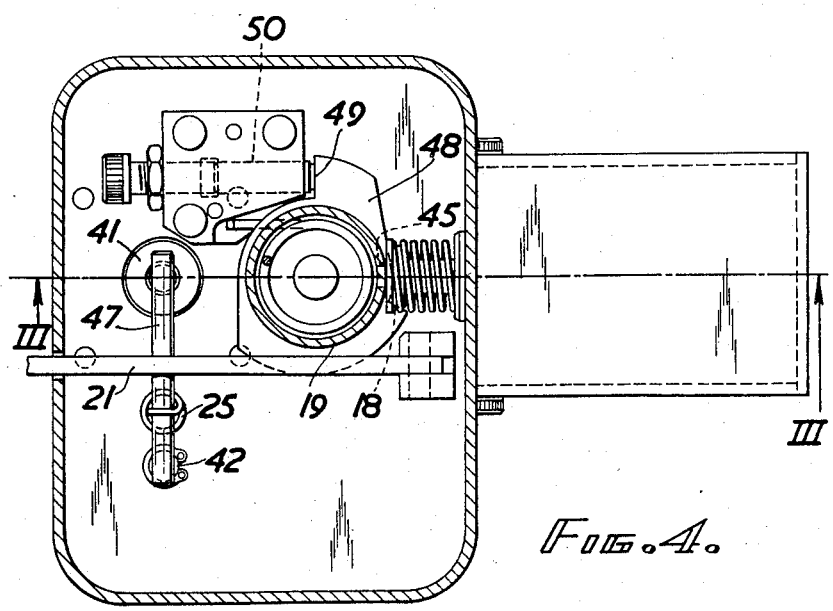
Figures 3 and 4 are both views of part of an embodiment of the invention which has been made. They show the mechanical tripping arrangements associated with a regulating valve in the inlet duct to the turbine.
Figure 3:
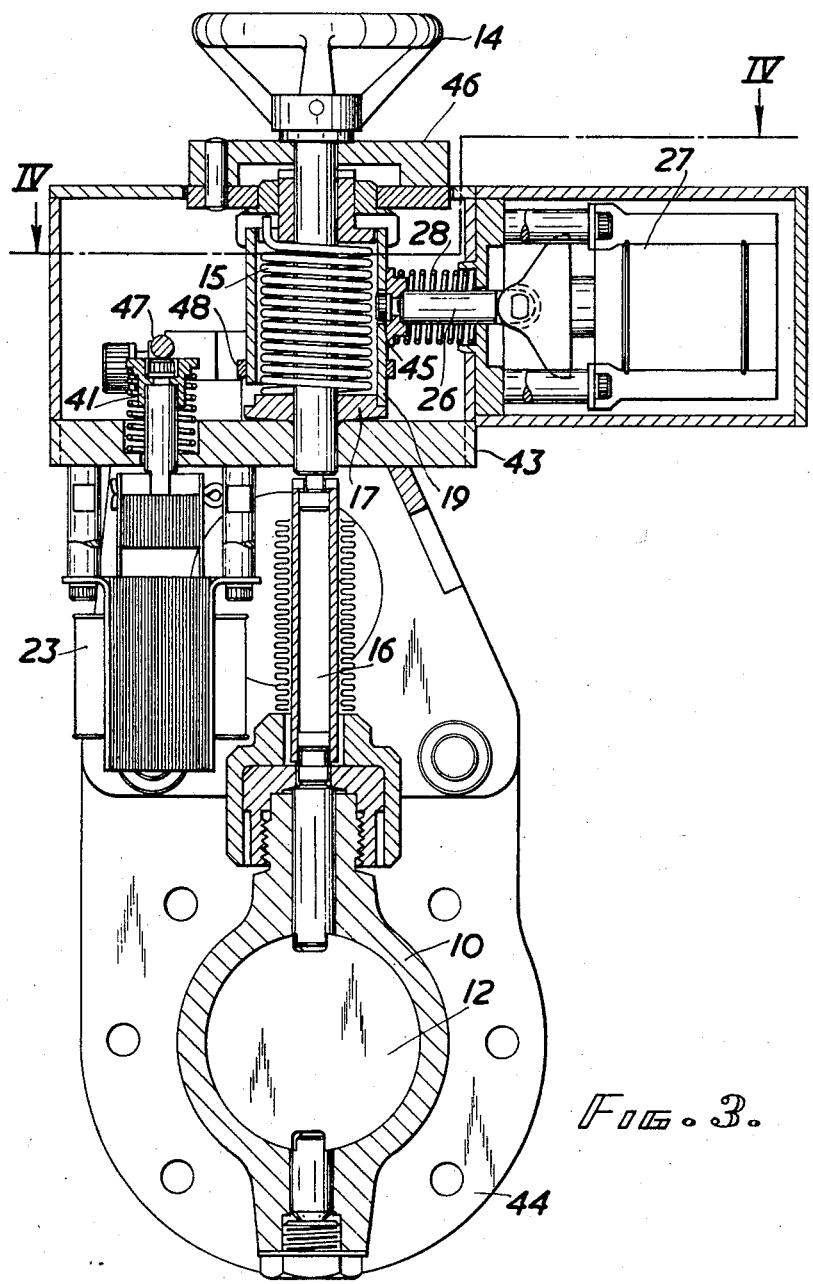

In Figures 3 and 4 there will be seen a practical embodiment of the butterfly valve mechanism already described in outline with the aid of the diagrammatic Figures 1 and 2. In Figures 3 and 4 the same reference numerals have been used as have already been used in Figures 1 and 2.

A platform 43 is mounted by means of flanges 44 above the duct 10 and the spindle 16 passes vertically through this platform. Below the platforms are mounted two solenoids 22 and 23; the position of the latter can be seen in Figure 3. Above the platform and to one side the solenoid 27 is fitted. The plate 17 has a collar extension 45 surrounding the spindle return spring 15. The handle 14 for operating manually the butterfly valve 12 is mounted on the top of the spindle 16 and the plate 46 immediately below the handle is engraved for correlation of the positions of the handle and the butterfly valve. It will be noticed from this figure that detent 19 takes the form of an aperture in the collar 45 the travel of the plunger 26 being arranged to be sufficient to engage this aperture but not to foul the spring 15 within the collar. As already shown in Figure 1 the lever arm 21 has a crosspiece 47 with which the solenoids 22 and 23 co-act. The spring 25 extends between the platform 43 and the cross-piece 47. The detent 18 is formed in a cam ring 48 carried by the collar extension of the plate 17. In Figure 4 the butterfly valve is shown in its closed position so that detent 18 is out of alignment with the lever arm 21. In the position shown the plunger 26 is engaged in the aperture 19 and the stop face 49 of the ring 48 is in engagement with the adjustable stop 50. The operation of the apparatus shown in Figures 3 and 4 is as described above in relation to the diagrammatic Figures 1 and 2.

Although the invention has been described above in relation to speed control made effective through variation of flow through a turbine, other embodiments of the invention are possible. For instance with any rotating machinery operating at high speeds a gear-down output shaft is an undesirable encumbrance simply to indicate the speed and to initiate the operation of a speed control arrangement. Hence there is no limitation of the invention in its broader aspects to fluid-flow turbo-machines. Where the latter are being considered, regulating the flow therethrough in response to a predetermined operating condition being attained is a method not only applicable to radially-inward flow turbines but for instance to centrifugal compressors also. The onset of surging in a compressor may be detected by pressure differences and the flow through the compressor adjusted in consequence.

The magnetic circuit described in relation to Figure 2 may be varied for instance by incorporating the magnet in the stator system and having the rotating co-operable part made of a magnetisable medium. The frequency of the output current from the pick-up unit is preferred as the operating characteristic for the controlling device but naturally the latter could be voltage-responsive for the output voltage is also a function of the speed of rotation.

What we claim is:

1. A control arrangement for a turbine and independently-driven oil pump assembly wherein the pump supplies lubricating oil to bearings of said turbine, comprising in combination a duct through which motive fluid is fed to said turbine, a two position butterfly valve in said duct, a valve spindle extending through said duct and externally thereof, spring means acting upon said spindle and normally urging said valve to a fully shut position, starting means for said pump, means responsive to lubricating oil pressure delivered by said pump, electrical contacts in said oil pressure responsive means adapted to be closed on attainment of a predetermined oil pressure, first, second and third solenoids, a first electrical circuit extending from said contacts in series through said first and second solenoids, mechanical locking means for said spindle in the fully shut valve position engageable by said first solenoid when said first circuit is open, speed discriminating means driven by said turbine, said speed discriminating means including an electrical generator, a second electrical circuit interconnecting said speed discriminating means and said third solenoid, said second circuit being closed in normal operation but opened by said speed discriminating means on attainment of a predetermined turbine speed, and a device engageable by said second and third solenoids and capable of engaging with said locking means and of holding said valve spindle and valve in a fully open position whenever said first and second circuits are closed.

2. A control arrangement for a turbine and an independently-driven oil pump assembly wherein the pump supplies lubricating oil to bearings of said turbine, comprising in combination a duct through which motive fluid is led to said turbine, a two positioned valve in said duct, means for urging said valve to a fully shut position, a first mechanical locking means for locking said valve in a fully shut position, a second mechanical locking means, said second mechanical locking means co-operating with said first mechanical locking means for locking said valve in a fully open position, means responsive to lubricating oil pressure delivered by said pump and an interconnection between said oil pressure responsive means and said first and second mechanical locking means operable to release the first mechanical locking means when the oil pressure attains a predetermined value and to disengage said second mechanical locking means when the oil pressure falls below a predetermined value.

3. The control arrangement of claim 2 which further comprises a discriminating means responsive to the rotational speed of the turbine to transmit a signal indicative of overspeeding thereof, and another interconnection between said discriminating means and said second mechanical locking means operable to disengage said second mechanical locking means when said signal is transmitted.

4. A control arrangement as claimed in claim 1, wherein said electrical generator comprises an electrical frequency generator, the output frequency of which is dependent upon turbine rotational speed, and low-pass filter means operable to cut-off a supply to said third solenoid, to operate said third solenoid and close said two position butterfly valve at a predetermined turbine speed.

References Cited in the file of this patent

UNITED STATES PATENTS

| | | |
|---|---|---|
| 869,248 | Kimball | Oct. 29, 1907 |
| 1,014,669 | Raymaker et al. | Jan. 16, 1912 |
| 1,409,529 | Dickinson | Mar. 14, 1922 |
| 2,010,420 | Simmen | Aug. 6, 1935 |
| 2,162,513 | Mc Shane | June 13, 1939 |
| 2,260,576 | Maybach | Oct. 28, 1941 |
| 2,285,208 | Johntz et al. | June 2, 1942 |
| 2,440,844 | Bryand | May 4, 1948 |